United States Patent
Claessens et al.

(10) Patent No.: US 11,630,277 B2
(45) Date of Patent: Apr. 18, 2023

(54) FIBER OPTIC CLOSURES AND SUPPORT STRUCTURES AND ASSEMBLIES FOR FIBER OPTIC CLOSURES

(71) Applicant: COMMSCOPE TECHNOLOGIES LLC, Hickory, NC (US)

(72) Inventors: Bart Mattie Claessens, Hasselt (BE); Roger Joseph Alaerts, Aarschot (BE)

(73) Assignee: CommScope Technologies LLC, Hickory, NC (US)

( * ) Notice: Subject to any disclaimer, the term of this patent is extended or adjusted under 35 U.S.C. 154(b) by 76 days.

(21) Appl. No.: 17/278,016

(22) PCT Filed: Sep. 18, 2019

(86) PCT No.: PCT/US2019/051648
§ 371 (c)(1),
(2) Date: Mar. 19, 2021

(87) PCT Pub. No.: WO2020/061144
PCT Pub. Date: Mar. 26, 2020

(65) Prior Publication Data
US 2021/0382258 A1 Dec. 9, 2021

Related U.S. Application Data

(60) Provisional application No. 62/733,990, filed on Sep. 20, 2018.

(51) Int. Cl.
*G02B 6/44* (2006.01)
(52) U.S. Cl.
CPC ......... *G02B 6/4454* (2013.01); *G02B 6/4446* (2013.01); *G02B 6/4471* (2013.01)

(58) Field of Classification Search
CPC ............................. G02B 6/4454; G02B 6/4446
See application file for complete search history.

(56) References Cited

U.S. PATENT DOCUMENTS

| 6,304,707 B1 * | 10/2001 | Daems ................. G02B 6/4442 385/71 |
|---|---|---|
| 2015/0168663 A1 | 6/2015 | Aznag et al. |
| 2015/0205064 A1 | 7/2015 | Claessens et al. |
| 2017/0052338 A1 | 2/2017 | Claessens et al. |
| 2017/0269324 A1 | 9/2017 | Im |
| 2017/0363831 A1 | 12/2017 | Cornelissen et al. |

FOREIGN PATENT DOCUMENTS

| WO | 2009/106874 A1 | 9/2009 |
| WO | 2018/231956 A1 | 12/2018 |

OTHER PUBLICATIONS

International Search Report and Written Opinion of the International Searching Authority for International Patent Application No. PCT/US2019/051648 dated Jan. 3, 2020, 14 pages.

\* cited by examiner

*Primary Examiner* — Sung H Pak
(74) *Attorney, Agent, or Firm* — Merchant & Gould P.C.

(57) ABSTRACT

Closure-mounted support structures and associated assemblies for supporting fiber optic management devices within a fiber optic closure defining a closure volume. The support structures are adapted to receive and hold axially distal portions of protection tubes that hold and protect portions of optical fibers as they are routed through the closure volume, and also to support optical fiber management trays into which the optical fibers can be routed upon exiting the protection tubes.

23 Claims, 16 Drawing Sheets

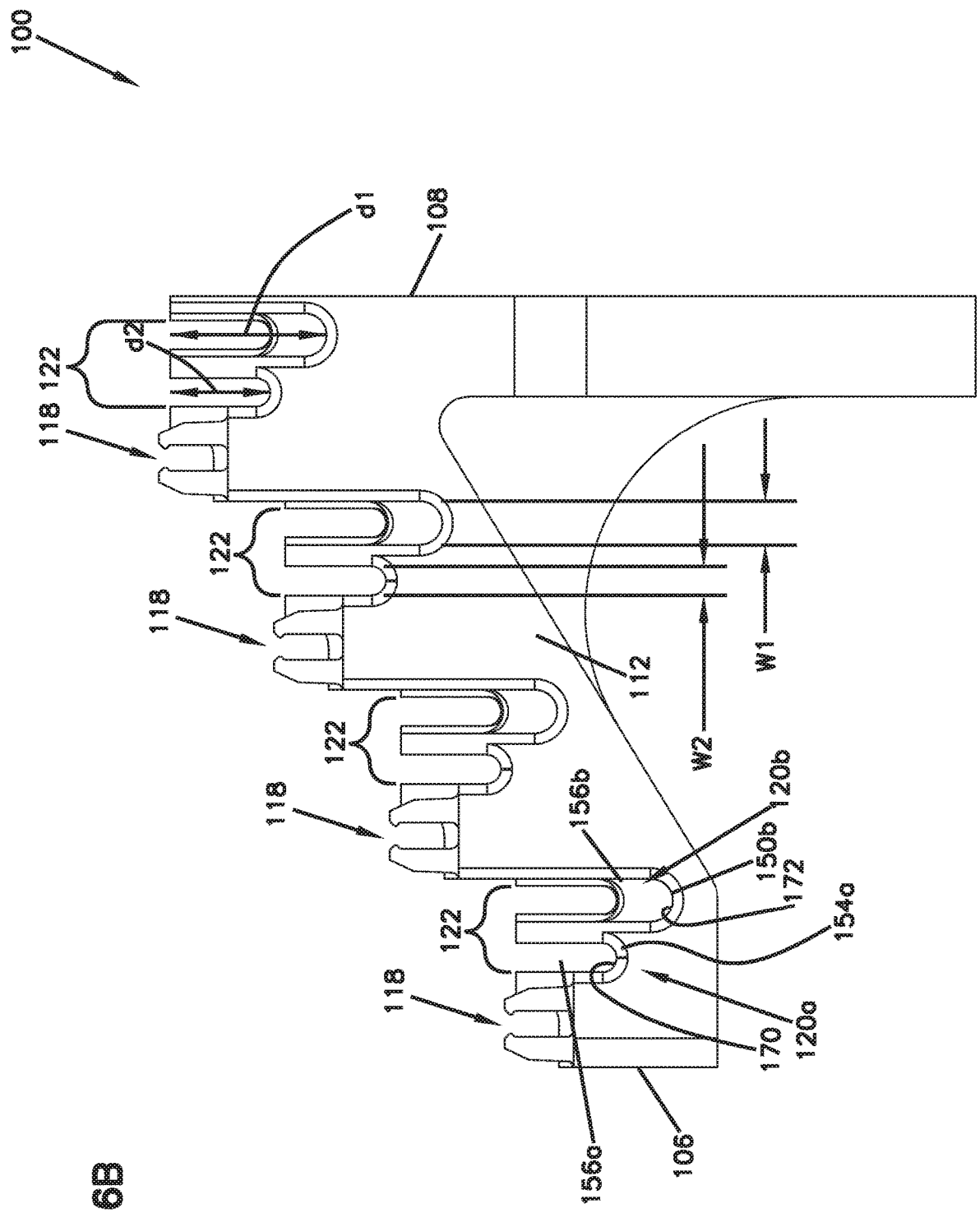

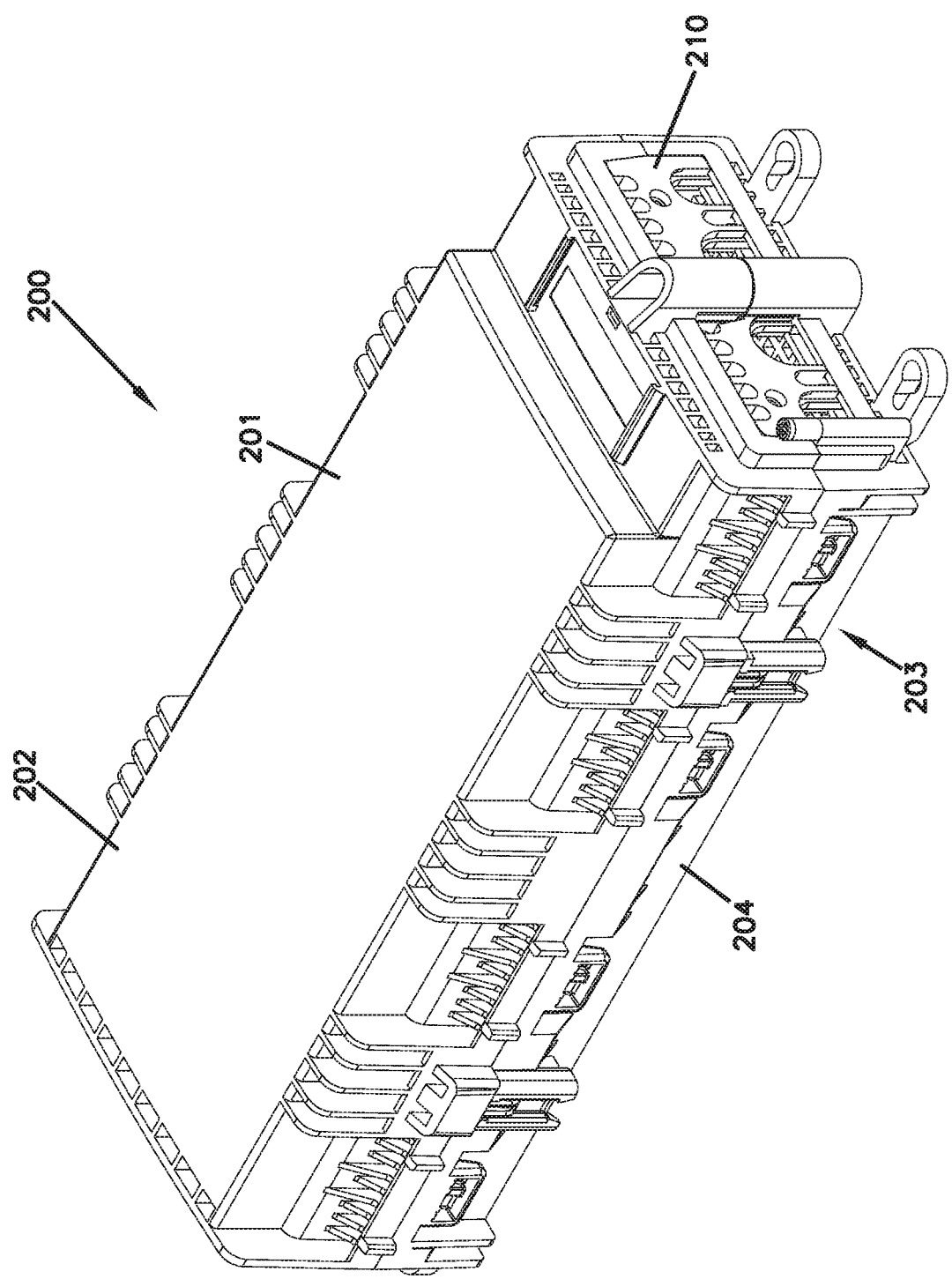

FIBER OPTIC CLOSURES AND SUPPORT STRUCTURES AND ASSEMBLIES FOR FIBER OPTIC CLOSURES

CROSS-REFERENCE TO RELATED APPLICATION

This application is a National Stage Application of PCT/US2019/051648, filed on Sep. 18, 2019, which claims the benefit of U.S. Patent Application Ser. No. 62/733,990, filed on Sep. 20, 2018, the disclosures of which are incorporated herein by reference in their entireties. To the extent appropriate, a claim of priority is made to each of the above disclosed applications.

BACKGROUND

Fiber optic cables hold optical fibers used to carry optical signals to and from telecommunications equipment. Typically, large cables, such as trunk cables (or "main" cables), carry a large number of fibers. The fibers of the main cable are spliced, split, optically connected to other fibers (e.g., via fiber optic connectors), or otherwise managed and routed to a desired destination, (e.g., a subscriber building). Due to the large number of fibers that need to be managed and routed, the main cable is often terminated in a fiber optic closure. Such fiber optic closures typically include an outer ruggedized and sealable shell defining an interior volume and one or more ports for cable access to the interior. The closures can be adapted for outdoor or indoor use. The interior volume of a closure typically houses structures and equipment to organize and route fibers to facilitate both storing of fibers and routing of fibers to their desired destinations. Portions of the optical fibers routed or otherwise organized within the closure volume often are held in protective sleeves or tubes.

SUMMARY

In general terms the present disclosure is directed to a management tray support structure for a telecommunications closure system. In some examples, the telecommunications closure system also includes a closure defining a closure volume that houses the support structure and the one or more trays supported by the support structure. The system can be used by, e.g., routing a feeder cable through a port defined by the closure and routing a portion of an optical fiber extending beyond a distal end of an outer jacket of the feeder cable and partially protected by a flexible protective tube within the closure volume to one or more fiber organizing trays supported by the tray support structure. Before the fiber is routed into a tray it is first routed through a protective tube holder defined by the tray support structure, such that a distal portion of the protective tube or a distal portion of a jacketed portion of a cable is positioned in and held by the protective tube holder and such that a distal end of the protective tube or the jacket of the cable does not enter a tray. A portion of the fiber extending beyond a distal end of the protective tube or beyond a distal end of the jacket of the cable can then be routed into a desired tray supported by the tray support structure.

Used in this manner, the management tray support structure of the present disclosure can provide various advantages over conventional telecommunications closure systems. For example, protection tubes are typically made of a material that can expand and shrink when exposed to varying temperatures. Axial shrinkage of the protection tube can be particularly problematic in causing damage to the optical fibers near the distal end of the protection tube as it recedes or otherwise changes shape due to the shrinkage. More specifically, protection tube shrinkage near the distal end of the protection tube can cause the protection tube to kink, and thereby cause the optical fiber(s) to kink. The optical fiber(s) typically protected by such protection tubes can be highly sensitive to kinking in that even small kinks can degrade the fiber or even render it completely inoperable. The management tray support structure of the present disclosure is adapted to retain a distal portion of the protection tube, including the distal end of the protection tube, such that expansion or shrinkage of the protection tube, particularly in the vicinity of the distal end of the protection tube, occurs in a controlled manner, minimizing the possibility of kinking and damaging the optical fiber or fibers surrounded by the protection tube.

In addition, in typical closure systems a distal portion of the protection tube is fed into the management tray such that the fiber or fibers protruding from that protection tube must be routed and organized on the same tray. In contrast, the management tray support structure of the present disclosure provides the further advantage of allowing a fiber or fibers extending beyond the distal end of the protection tube to be selectively routed into one of a plurality of trays supported by the management tray support structure, thereby providing enhanced tray routing flexibility by a technician working with the closure.

Yet a further example advantage provided by the management tray support structure of the present disclosure relates to the positioning of the protection tube holder relative to the fiber entry points on the trays. In at least some examples, fiber entry points defined by the trays are positioned at the same end of the trays as the coupler that couples the trays to the tray support structure. The tray support structure, in addition to defining the protection tube holders, also defines structures that receive and pivotally retain the couplers of the trays. Thus, the portion of the fiber or fibers extending beyond the distal end of the protection tube or beyond the distal end of the cable jacket is routed only a very short distance (unprotected by the protection tube or the cable jacket) until it enters a tray.

According to certain aspects of the present disclosure, a telecommunications management tray support structure comprises a body, the body defining one or more tray coupler retainers adapted to receive and retain a fiber management tray coupler, the body further defining one or more protection tube holders adapted to hold a distal end portion of an optical fiber protection tube and/or a distal end portion of a cable jacket.

In some examples the body defines a plurality of the protection tube holders.

In some examples the body defines a plurality of the protection tube holders and a plurality of the tray coupler retainers.

In some examples, a ratio of a number of the protection tube holders to a number of the tray coupler retainers is 2:1, or approximately 2:1.

In some examples, a ratio of a number of the protection tube holders to a number of the tray coupler retainers is 1:1, 3:1, 4:1, 5:1, 6:1 or greater.

In some examples, the body extends from a first end to a second end, wherein the tray coupler retainers alternate with at least one of the protection tube holders from the first end to the second end.

In some examples, the body extends from a first end to a second end, wherein the tray coupler retainers alternate with pairs of the protection tube holders from the first end to the second end.

In some examples, each of the protection tube holders includes a first open longitudinal end defining a first opening and an opposing second longitudinal end defining a second opening, the first opening being wider than the second opening and being sized to receive a distal portion of a protection tube.

In some examples, each of the protection tube holders includes a first longitudinal portion extending longitudinally from the first opening and defining a first receiving section, and a second longitudinal portion extending longitudinally from the second opening and defining a second receiving section, the second receiving section defining a lateral inner diameter corresponding to the lateral inner diameters of the first receiving section and that is smaller than a lateral inner diameter defined by the first receiving section such that the first receiving section is sized to receive a distal portion of a protection tube, the second receiving section is sized to be too small to receive the distal portion of the protection tube, and a transition between the first receiving section and the second receiving section defines a shoulder projecting radially towards a longitudinal axis of the protection tube holder, the shoulder adapted to act as a distal stop for the distal end of the protection tube.

In some examples, the plurality of protection tube holders are arranged in pairs, wherein the first openings of each of the pairs are positioned at opposite ends of the respective protection tube holders.

In some examples, each of the protection tube holders is adapted to receive one, two, or more protection tubes. In some examples, each of the protection tube holders defines a slot (optionally, the slot is at a top of the protection tube holder) through which one or more protection tubes can be inserted (optionally, inserted downwards or upwards) to be received by the protection tube holder.

According to further aspects of the present disclosure, a telecommunications closure system includes a closure defining a closure volume and a plurality of cable ports, a telecommunications management tray support structure positioned in the closure volume and including a body, the body defining one or more tray coupler retainers adapted to receive and retain a fiber management tray coupler, the body further defining one or more protection tube holders adapted to hold a distal end portion of an optical fiber protection tube; and at least one optical fiber management tray coupled to the tray support, wherein an optical fiber carried by a cable positioned in one of the cable ports is routed onto the fiber management tray via a first of the one or more protection tube holders, and wherein a portion of the optical fiber is surrounded by a distal portion of a protection tube held by the first protection tube holder.

According to further aspects of the present disclosure, a telecommunications closure system comprises: a telecommunications management tray support structure including a body, the body defining one or more tray coupler retainers adapted to receive and retain a fiber management tray coupler, the body further defining one or more protection tube holders adapted to hold a distal end portion of an optical fiber protection tube; and at least one optical fiber management tray coupled to the tray support, wherein the telecommunications management support structure and the tray are arranged such that an optical fiber extending from a distal end portion of a protection tube can be routed onto the fiber management tray via a first of the one or more protection tube holders when the protection tube is held by the first protection tube holder.

According to further aspects of the present disclosure, a method of routing an optical fiber onto an optical fiber management tray comprises: providing a telecommunications management tray support structure including a body, the body defining one or more tray coupler retainers adapted to receive and retain a fiber management tray coupler, the body further defining one or more protection tube holders; coupling an optical fiber management tray to one of the tray coupler retainers; inserting a distal end portion of a protection tube into one of the protection tube holders; and feeding a portion of an optical fiber extending distally beyond a distal end of the protection tube into the optical fiber management tray.

In some examples, the optical fiber management tray includes a first end and an opposite second end, the first end including a coupler for coupling the tray to one of the one or more tray coupler retainers, and wherein the feeding includes feeding the portion of the optical fiber extending distally beyond a distal end of the protection tube through a fiber entryway defined by the tray and positioned at the first end of the tray.

In some examples, the coupling includes coupling at least a first and a second of the optical fiber management trays to at least first and second of the tray coupler retainers, and the method further comprises, prior to the feeding, selecting one of the first and second trays for the feeding. In some examples, the inserting includes inserting distal end portions of first and second protection tubes into one of the protection tube holders. In some examples, the inserting includes inserting distal end portions of first and second protection tube holders into first and second of the protection tube holders, wherein one of the tray coupler retainers is positioned between the first and second protection tube holders. In some examples, the feeding includes feeding a portion of a first optical fiber extending distally beyond a distal end of the first protection tube through a first fiber entryway defined by the first or second optical fiber management tray and positioned at the first end of the first or second optical fiber management tray and on a first side of the tray support structure, and feeding a portion of a second optical fiber extending distally beyond a distal end of the second protection tube through a second fiber entryway defined by the first or second optical fiber management tray and positioned at the first end of the first or second optical fiber management tray and on a second side of the tray support structure. In some examples, the feeding of the portion of the first optical fiber is onto the same optical fiber management tray as the feeding of the portion of the second optical fiber. In some examples, the feeding of the portion of the first optical fiber is onto a different one of the first and second optical fiber management trays than the feeding of the portion of the second optical fiber.

In some examples, each of the protection tube holders defines a slot through which one or more protection tubes can be inserted to be received by the protection tube holder, and wherein the method further comprises, after the inserting, inserting a plug at least partially through the slot, the plug being adapted to retain the protection tube within the protection tube holder.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

FIG. 6B is a further side view of the example support structure of FIG. 4, from the opposite side of FIG. 6A.

FIG. 7 is a perspective view of an example telecommunications closure housing the support structure of FIG. 4.

DETAILED DESCRIPTION

Figure 1:
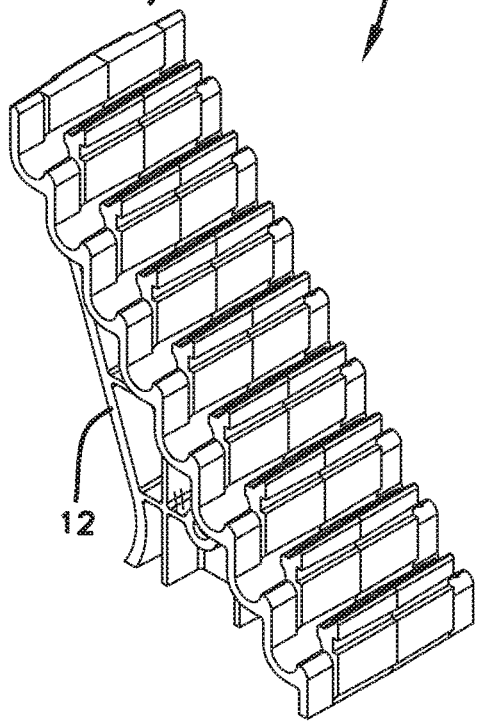
FIG. 1 is a front perspective view of a prior art optical fiber management tray support structure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
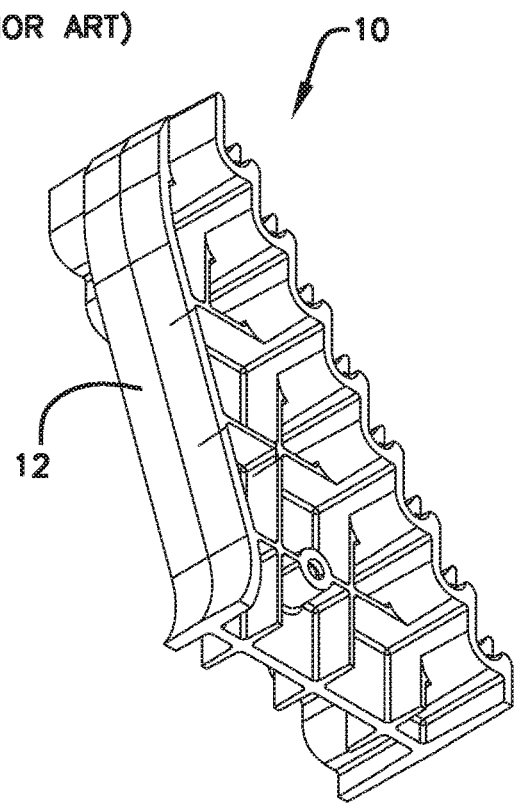
FIG. 2 is a rear perspective view of the prior art optical fiber management tray support structure of FIG. 1.
Figure 3:
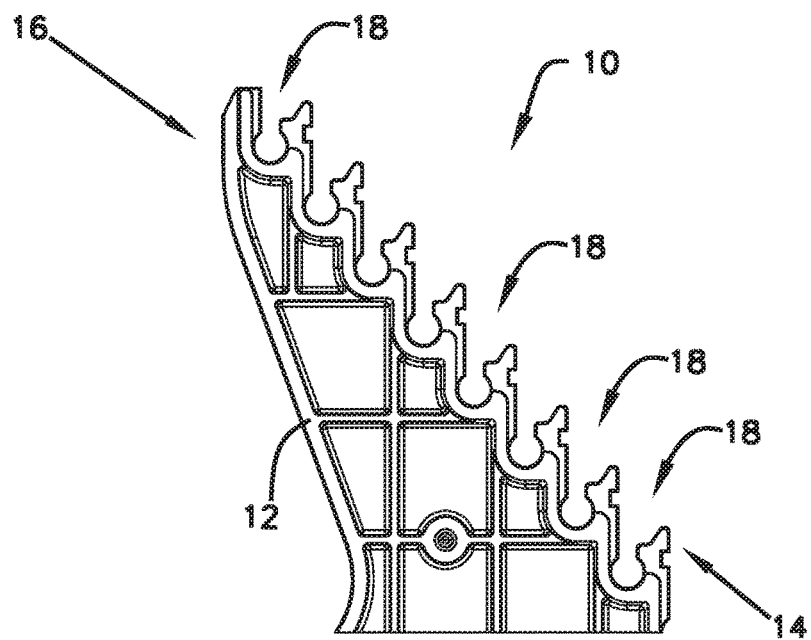
FIG. 3 is a side view of the prior art optical fiber management tray support structure of FIG. 1.

Referring to FIGS. 1-3, a prior art optical fiber management tray support structure 10 includes a body 12 defining a plurality (in this case, eight) pin receivers 18. The pin receivers 18 are arranged in a stepped configuration between a first end 14 and a second end 16 of the support structure 10. The pin receivers 18 are adapted to pivotally receive and couple pins of fiber optic management trays. Thus, at capacity, the support structure 10 supports a stack of eight trays one atop another in a staggered arrangement. A technician can pivot one or more trays in the stack away from the tray upon which work is to be performed, the pivoting thus allowing access to the desired tray for performing fiber management in the desired tray. The support structure 10 is not adapted to hold or otherwise engage tubes that protect the fibers up to the location where the fibers are organized and managed in the trays supported by the support structure 10. The support structure 10 is adapted to be mounted within a closure volume of a telecommunications closure that routes and/or distributes optical signals from one or more input (or feeder) cables to one or more output (or drop) cables.

Referring to FIGS. 4, 5, 6A and 6B, an optical fiber management support tray support structure 100 in accordance with the present disclosure is depicted, the support structure 100 providing at least one advantage over the prior art support structure 10 described above.

The support structure 100 includes a body 102 and, optionally, a mounting leg 104 extending from the body 102. The mounting leg 104 is adapted to mount the support structure 100 to another device or structure within a closure volume defined by a telecommunications closure. The support structure 100 extends from a first end 106 to a second end 108, has a first side 110 and an opposing second side 112, and has a top 114 and a bottom 116.

The body 102 defines a plurality of tray coupler retainers 118 and a plurality of protection tube holders 120. In this example, the body 102 defines four of the retainers 118, which alternate from the first end 106 to the second end 108 with four pairs 122 of the tube holders 120 in a stepped configuration. It should be appreciated that the body 102 can be modified to define more than or fewer than four of the retainers 118 and more than or fewer than eight of the protection tube holders 120 (or more than or fewer than the four pairs 122 of protection tube holders 120). For example, the body 102 can define eight of the retainers 118 alternating with eight of the pairs 122 of protection tube holders 120.

Each of the retainers 118 extends longitudinally from the first side 110 to the second side 112. In addition, each of the protection tube holders 120 extends longitudinally from the first side 110 to the second side 112.

In the example embodiment shown, each of the retainers 118 defines a hollow elongated along the longitudinal axis of the retainer 118 and consisting of a floor 124 and a curved sidewall 126 extending from the floor 124. At each longitudinal end of the hollow is a pair of flexibly resilient retaining members 128. Each pair of retaining members 128 are adapted to flex away from each other to receive a coupler pin of an optical fiber management tray, such that a pin head of the pin can rotate about the longitudinal axis of the pin in the hollow of the retainer 118. Once the pin is fully inserted between the pair of retaining members 128, the retaining members 128 resiliently return to their unflexed configuration to securely retain the pin therein.

Each of the protection tube holders 120 defines a well that extends longitudinally from the first side 110 to the second side 112. Each of the protection tube holders 120 has a slot 130. A pair of side walls extend from the slot 130 to define one or more tube holding positions between the slot 130 and the floor 136 of the protection tube holder 120. In the example shown, the floor 136 defines a concave rounded surface facing partially upwards that geometrically complements the outer surface of a protection tube. Each of the pairs 122 of the protection tube holders 120 includes three side walls 132, 134, and 138 that together define the two wells of the pair 122, the three side walls including a top side wall 132, a middle side wall 134, and a bottom side wall 138 for each pair 122. The middle side wall 134 is shared by both protection tube holders 120 in each pair 122. In this example, a portion of the bottom side walls 138 is positioned between longitudinally opposing retaining members 128 of the retainers 118 that is positioned immediately below the particular tube holder 120.

Each of the protection tube holders 120 includes a first open longitudinal end defining a first opening and an opposing second longitudinal end defining a second opening. Referring to the protection tube holders 120a and 120b (FIGS. 5, 6A, 6B) of one of the pairs 122 as examples, the protection tube holder 120a includes a first longitudinal end 150a defining a first side opening 152a, and a second longitudinal end 154a defining a second side opening 156a. The protection tube holder 120b includes a first longitudinal end 150b defining a first side opening 152b, and a second longitudinal end 154b defining a second side opening 156b. The first side openings 152a and 152b have a greater width w1 than the corresponding width w2 of the second openings 156a and 156b. The first side openings 152a and 152b are sized to receive a distal axial portion of a protection tube, while the second openings 156a and 156b are sized to be too small to receive a distal axial portion of a protection tube. With respect to the two holders 120a, and 120b, their respective first openings 152a, 152b, are on opposite sides 110, 112 of the support structure 100. Likewise, their respective second openings 156a 156b are on opposite sides 112, 110 of the support structure 100.

Figure 4:
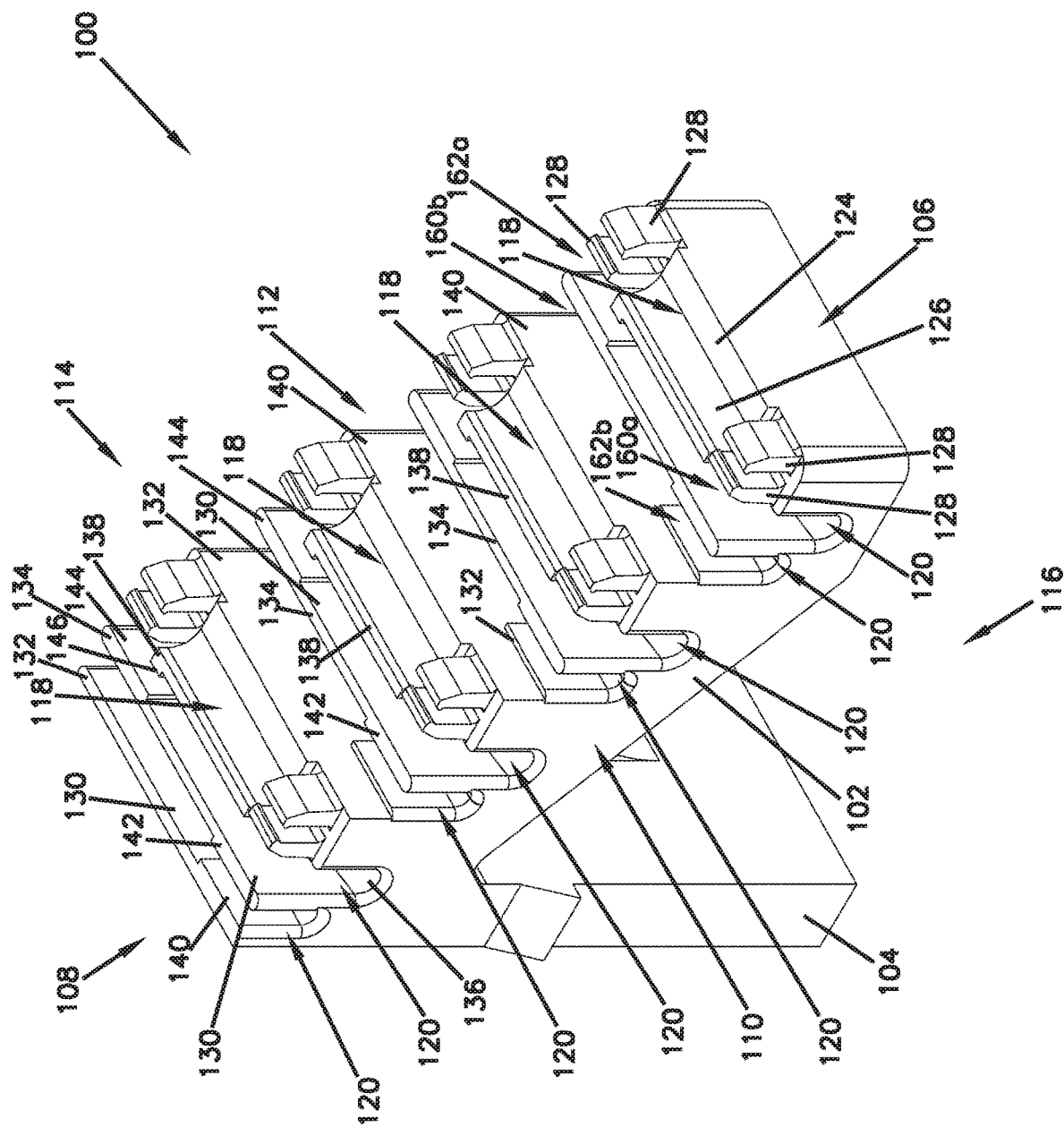
FIG. 4 is a perspective view of an example telecommunications management tray support structure in accordance with the present disclosure and providing one or more advantages over the prior art optical fiber management tray support structure of FIG. 1.
Figure 5:
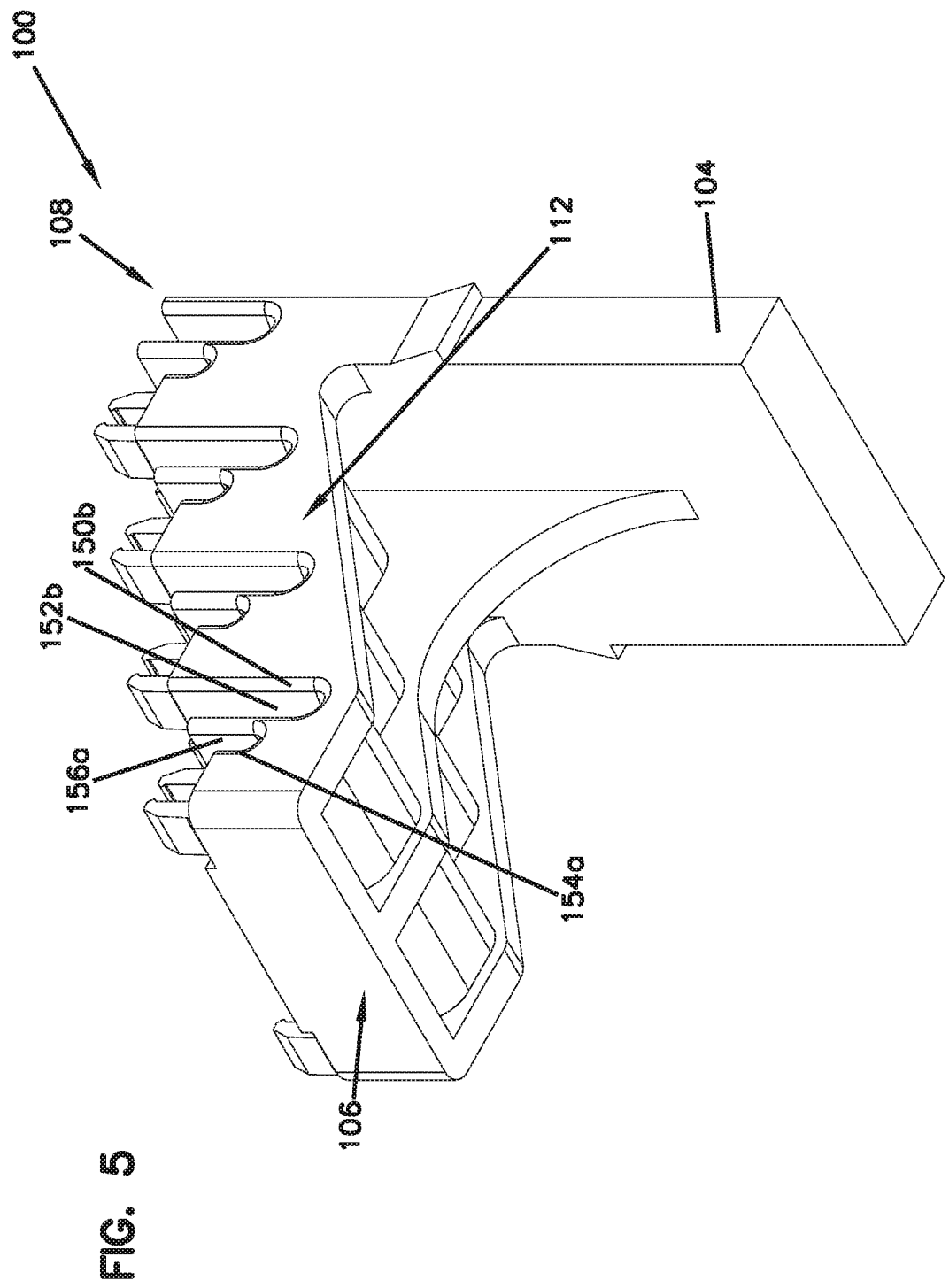
FIG. 5 is a further perspective view of the example support structure of FIG. 4.
Figure 6A:
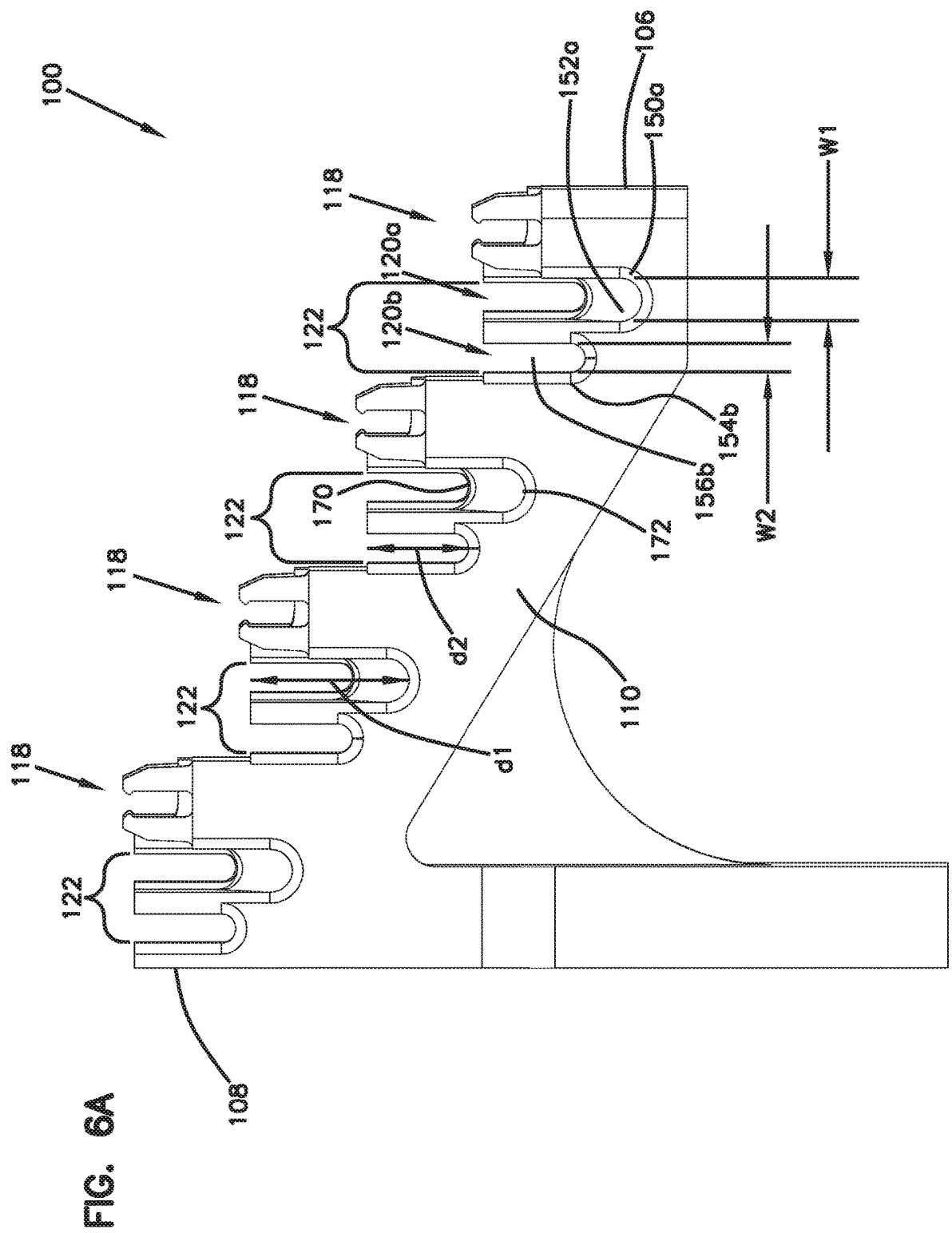
FIG. 6A is a side view of the example support structure of FIG. 4.

Each of the holders 120a, 120b in each pair 122 includes a first longitudinal portion extending longitudinally from the first opening 152a, 152b towards the second opening 156a, 156b and defining a first receiving section 160a, 160b (FIG. 4), and a second longitudinal portion extending longitudinally from the second opening 156a, 156b towards the first opening 152a, 152b and defining a second receiving section 162a, 162b (FIG. 4). The first receiving section 160a, 160b is partially defined by the lateral inner diameter w1. The second receiving section 162a, 162b is partially defined by the lateral inner diameter w2. Thus, the first receiving section 160a, 160b of each pair 122 of holders 120 is sized to be large enough to receive a distal portion of a protection tube, and the second receiving section is sized to be too small to receive the distal portion of the protection tube.

In addition, the first receiving sections 160a, 160b of each pair 122 is defined by a depth d1 from the top of the holder 120, while the second receiving sections 162a, 162b of each pair 122 is defined by a depth d2 from the top of the holder 120, where d2 is less than d1. The difference in depth between d1 and d2 provides a bottom surface 170 in the second receiving sections 162a, 162b of each pair 122 that is elevated relative to the bottom surface 172 of the corresponding first receiving sections 160a, 160b, in the same holder 120. The bottom surfaces 172 are concave, partially facing upwards, and adapted to support a protection tube or a plug. The bottom surfaces 170 are adapted to support optical fibers extending beyond the distal end of the protection tube that is supported in the corresponding first receiving section.

Projections (or shoulders) from the walls of the protection tube holders 120 define the second receiving sections 162a, 162b in each pair 122 of protection tube holders 120. In particular, a projection 140 from each top wall 132 projecting at least partially towards the first end 106 of the support structure 100 and a projection 142 from each middle wall 134 and projecting at least partially towards the second end 108 of the support structure face each other and define the width w2 therebetween of the second receiving section of each upper holder (the holder 120 closer to the second end 108) in each pair 122 of holders 120. Similarly, a projection 144 from each middle wall 134 and projecting at least partially towards the first end 106 and a projection 146 from each bottom wall 138 and projecting at least partially towards the second end 108 face each other and together define the width w2 therebetween of the second receiving section of the lower holder (the holder 120 closer to the first end 106) in each pair 122 of holders 120.

Figure 8:
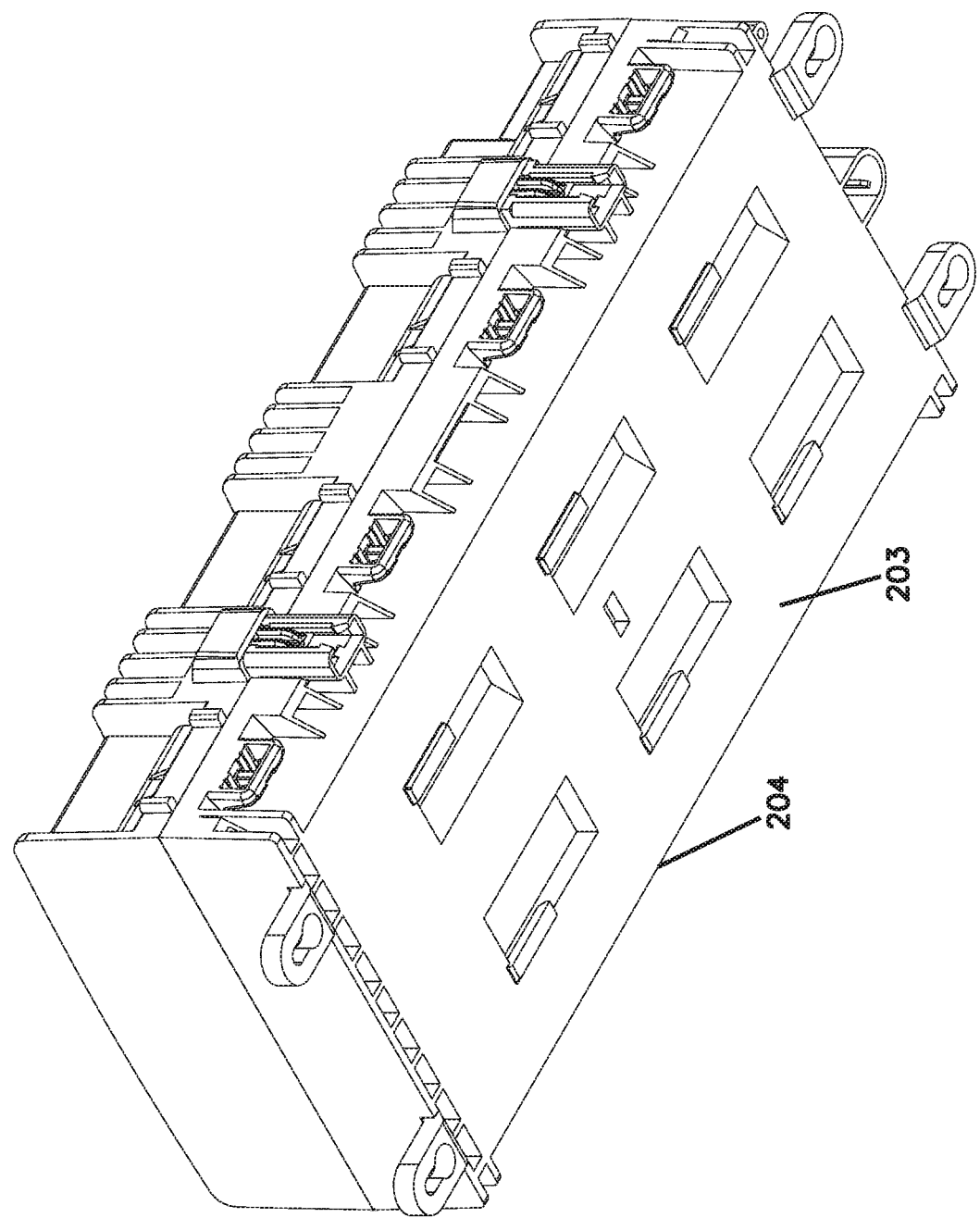
FIG. 8 is a further perspective view of the closure of FIG. 7.
Figure 9:
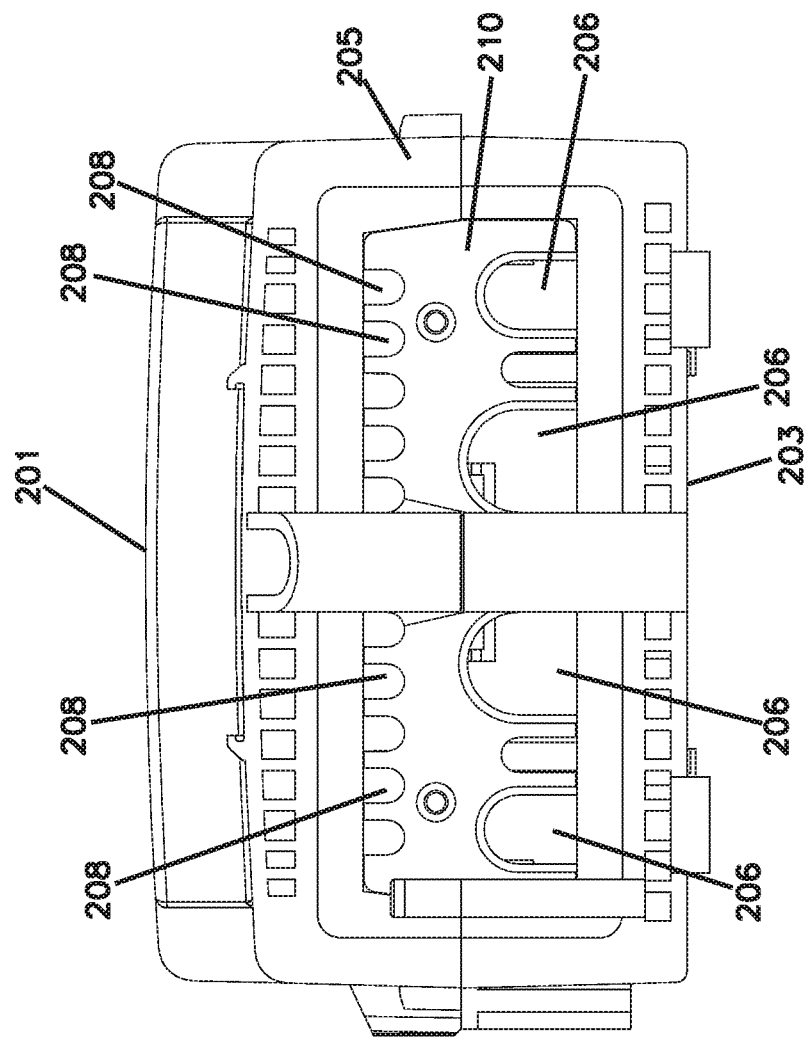
FIG. 9 is an end view of the closure of FIG. 7.

Referring now to FIGS. 7-9 an example telecommunications closure 200 is depicted. The closure 200 defines a closure volume containing one of the support structures 100 and one or more optical fiber management trays supported by the one or more support structures 100.

The closure 200 includes a first housing piece 202 and a second housing piece 204 that can be opened and closed to selectively provide a sealed closure volume or to provide access to the closure volume, i.e., to the telecommunications equipment housed in the closure volume. Optionally the first and second housing pieces 202 and 204 are pivotally coupled by a hinge to enable the closure 200 to be selectively opened and closed. The first and second housing pieces 202 and 204 can be ruggedized to protect the interior volume from a potentially harmful exterior environment. Thus, for example, the closure 200 can be configured for operation outdoors, below ground, etc. In some examples, the closure 200 can be mounted to another structure, e.g., a wall, a pole, etc.

The first and second housing pieces 202 and 204, when closed together, define a plurality of cable ports 206, 208. A sealing block 210 can be placed at the cable entry end 205 of the closure 200 to provide sealing around the cable jackets as they enter the closure volume. Thus, for example, the sealing block 210 can define openings to receive cables. The cable ports 206, 208 sealingly receive input cables (e.g., feeder cables) and output cables (e.g., drop cables) carrying optical fibers. The optical fibers are managed within the interior volume. Such fiber management can include, for example, storage of fiber slack, splicing of optical fibers together, splitting optical fibers, indexing optical fibers, wave division multiplexing of optical fibers, and connecting optical fibers to one another without splicing, e.g., by connecting a connectorized input fiber to a connectorized output fiber with an adapter.

The closure 200 includes a top 201 and a bottom 203. In this example closure 200, all of the ports (i.e., both the feeder ports 206 and the drop ports 208), are defined in the same end 205 of the closure 200. In other examples, the ports can be positioned on multiple sides of the closure 200. For example, in an inline closure, a feeder port is positioned at one end of the closure, and a drop port is positioned at the opposing end of the closure. It should be appreciated that the tray support structures and corresponding closure systems of the present disclosure can be used with a variety of different closure configurations.

Referring now to FIGS. 10-14, aspects of a non-limiting example of a fiber management arrangement 300 and fiber routing scheme using the support structure 100 will be described. It should be appreciated that the support structure 100 can be used in a variety of other closure systems, arrangements, and fiber routing schemes, without deviating from the principles of the present disclosure.

A management device 302 is positioned within the interior volume defined by the closure 200. The device 302 has a top 301 and a bottom 303. A divider 304 substantially defines an upper region 308 of the device 302 above the divider 304, and a lower region 310 of the device 302 below the divider 304. A cutout 306 in the wall 312 of the device 302 defines a passageway that allows for routing of fibers and/or protection tubes between the upper and lower regions 308, 310.

Figure 13:
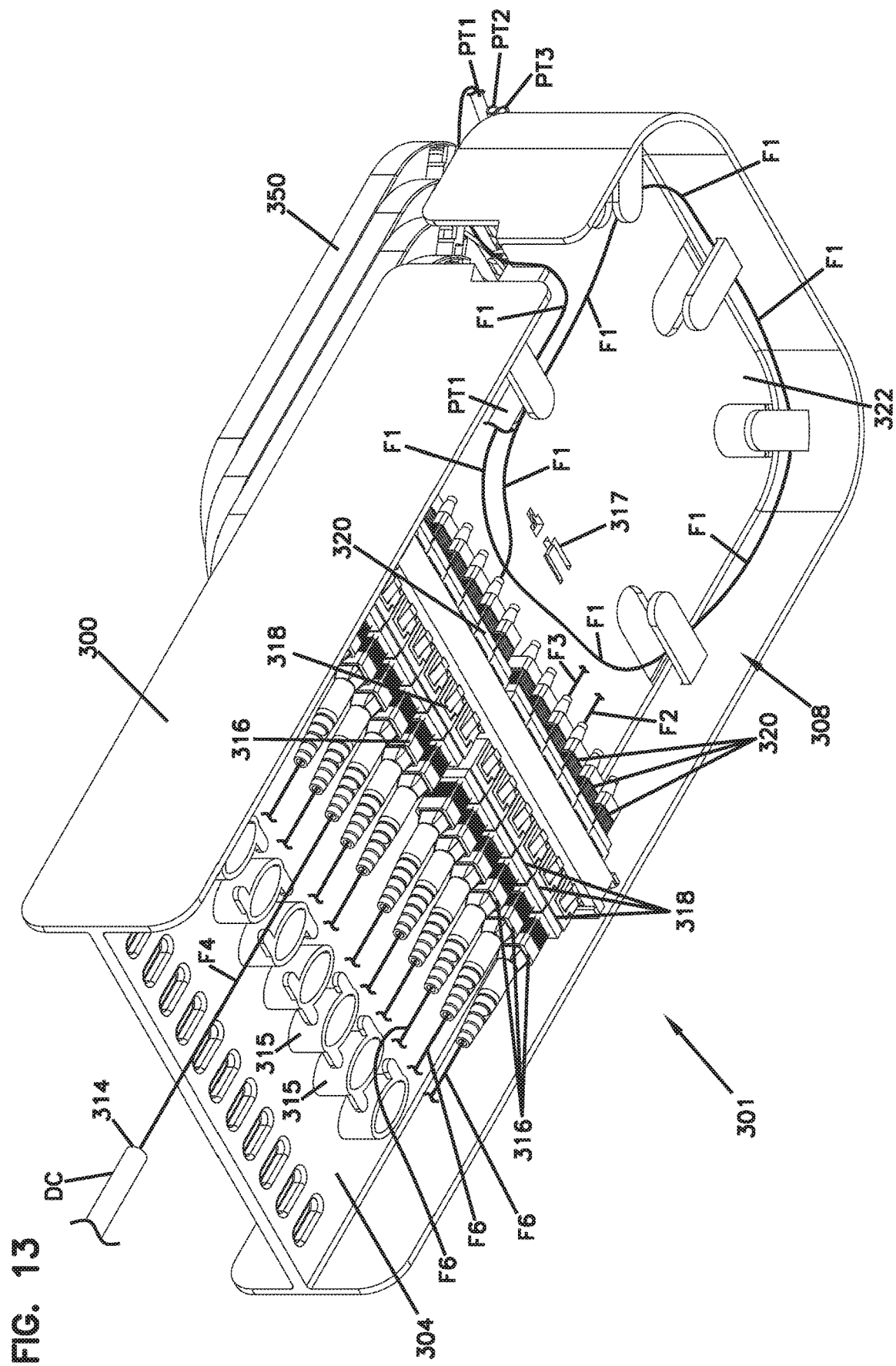
FIG. 13 is a further perspective view of the example support structure arrangement of FIG. 10.
Figure 14:
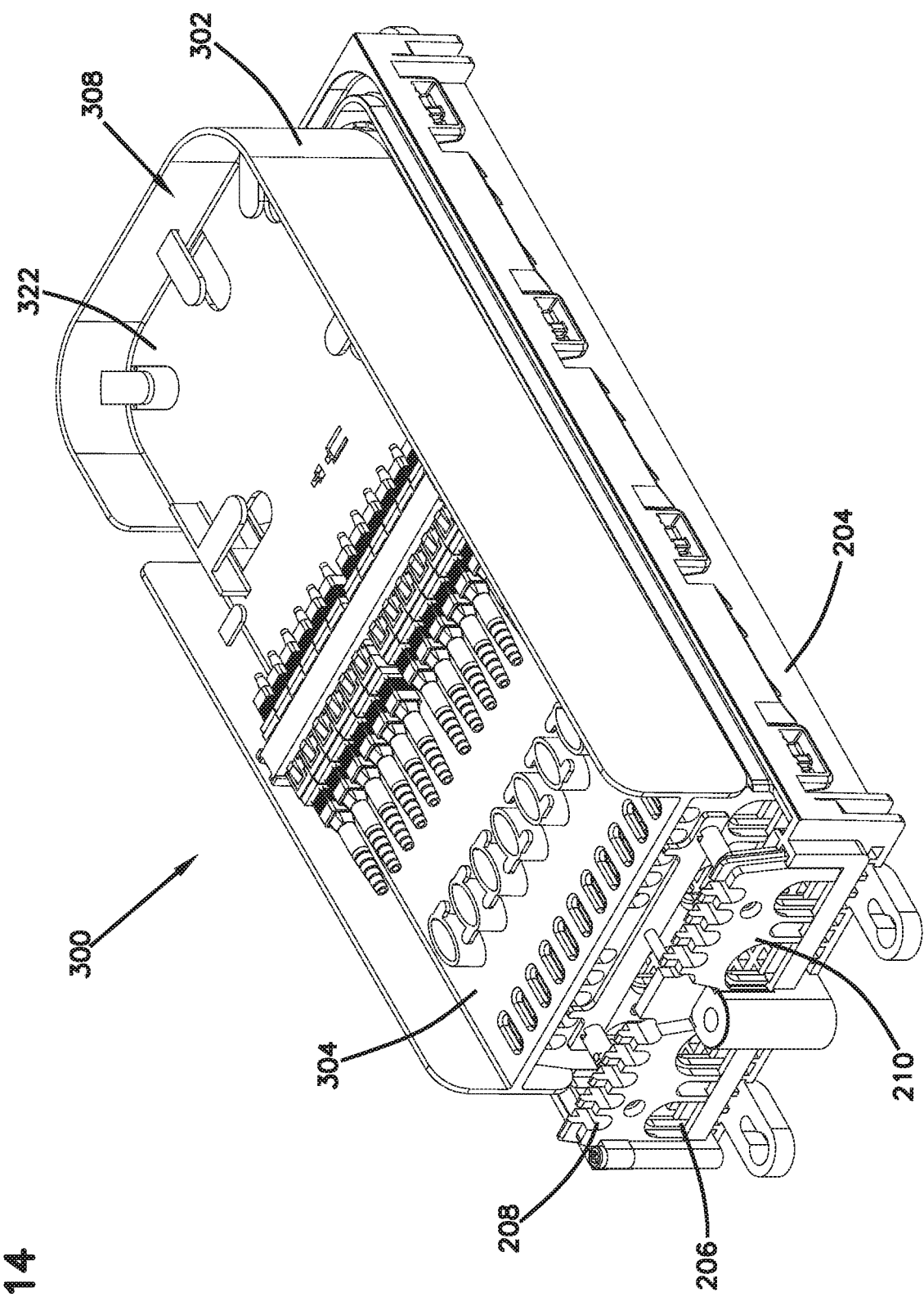
FIG. 14 is a perspective view of the example support structure arrangement of FIG. 10 positioned within a portion of the interior volume defined by the closure of FIG. 7.

Non-limiting examples of fiber management and routing operations will now be described with respect to a single input fiber that is connected to a single output fiber. Referring to FIG. 13, an optical fiber F4 extends distally from a distal end 314 of the jacketed portion of a drop cable DC terminated at the closure 200 (FIG. 7). Once within the closure volume, the fiber F4 is in the upper region 308 defined by the device 302. Optionally, the fiber F4 includes slack that can be looped around one or more of the slack organizers 315 projecting upwards from the divider 304. Optionally, the fiber F4 is protected by a protection tube (not shown). A distal end of the fiber F4 is terminated at a drop-side fiber optic connector 316 of a series of such drop-side connectors 316. The drop-side connecter 316 is mounted in an adapter 318 and thereby optically connected to a feeder fiber F1 terminated at a feeder-side connector 320 (of a series of such feeder-side connectors 320) mounted on an opposing side of the adapter 318. Optionally, one or more fiber management component structures 317 are provided in the slack area 321. The mounting structure 317 can mount, e.g., a splice holder, a splitter holder, a wave division multiplexor holder, etc.

The feeder fiber F1 is sleeved into a flexible protection tube PT1. The protection tube PT1 is configured to, e.g., protect the fiber F1 from kinking, over-bending, or getting pulled, particularly as the fiber F1 is routed from the upper region 308 to the lower region 310 of the device 302. Optionally, fiber slack of the feeder fiber F1 is looped one or more times in the slack area 322 of the upper region 308 before the feeder fiber F1 is routed to the lower region 310. Optionally, a portion or all of the looped slack is also surrounded by the protection tube PT1.

Figure 10:
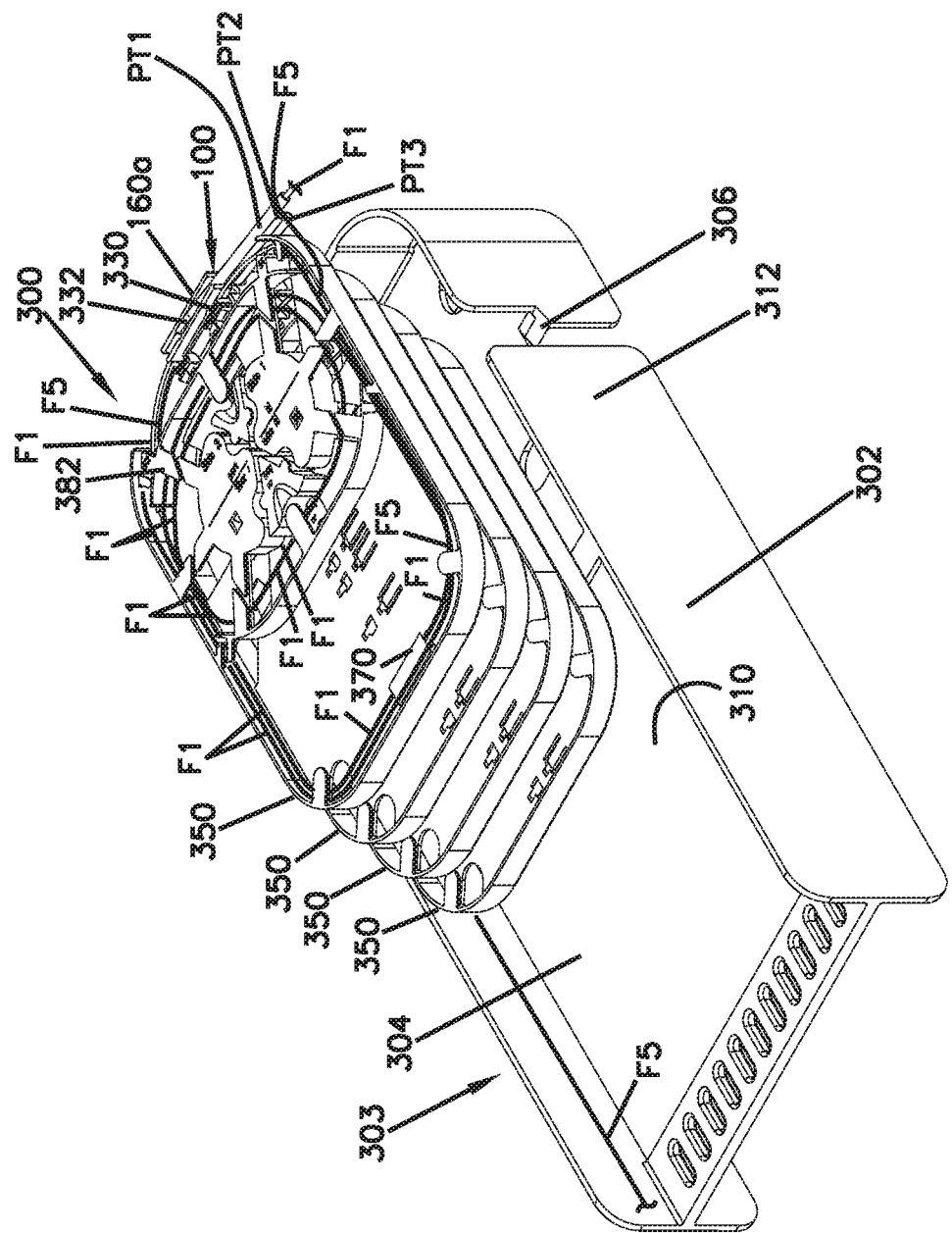
FIG. 10 is a perspective view of an example support structure arrangement in accordance with the present disclosure.
Figure 11:
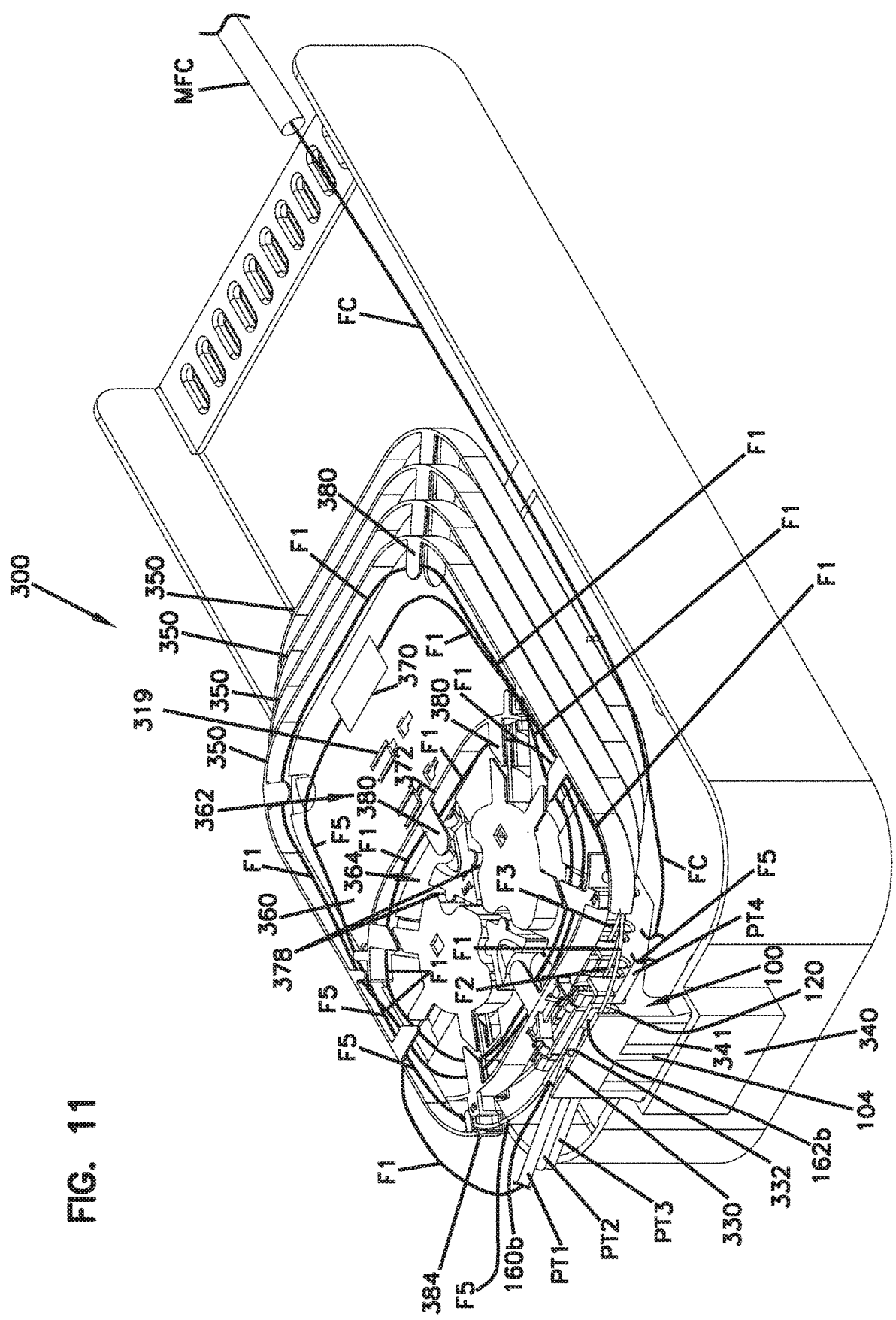
FIG. 11 is a further perspective view of the support structure arrangement of FIG. 10.
Figure 12:
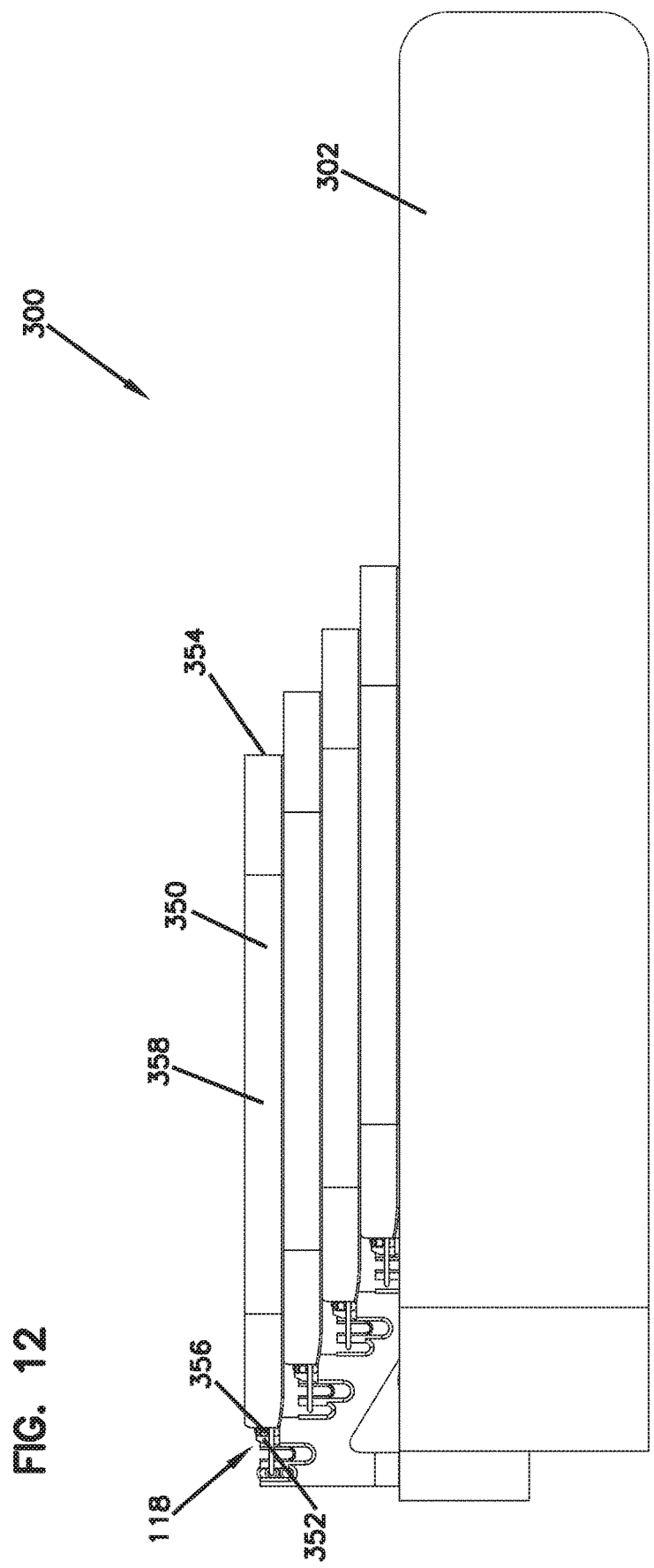
FIG. 12 is a side view of the support structure arrangement of FIG. 10.

Referring now to FIGS. 10 and 11 the portion of the protection tube PT1 carrying the fiber F1 that enters the lower region 310 includes an axial distal portion 330 terminating at the distal end 332 of the protection tube PT1. The distal portion 330 is received and held (e.g., by a frictional fit) within the first receiving section 160b of one of the protection tube holders 120 of the support structure 100. The fiber F1 extends beyond the distal end of the protection tube PT1 and can be selectively fed into any of the trays 350 supported by the support structure 100.

Each of the trays 350 has a first end 352 where the tray 350 is pivotally coupled to the support structure 100 and a second end 354 that is opposite to the first end 352. In addition, the mounting leg 104 of the support structure 100 is received and mounted in a receptacle 340 defined by the device 300. The receptacle 340 has an open top 341 via which the mounting leg 104 is inserted. Each tray 350 includes one or more coupling pins 356 at the first end 352 that are pivotally received in one of the tray coupler retainers 118 of the support structure 100.

Each of the trays 350 includes a wall 358 substantially surrounding a major surface 360. A divider wall 372 extending from the major surface 360 divides the tray 350 into a first fiber management area 362 and a second fiber management area 364. The first fiber management area 362 is configured to store loops of fiber slack about the outer perimeter of the area 362. In addition, one or more management components, such as a splitter, wave division multiplexor, or a splice holder 370 can be mounted in any of multiple component parking locations on the major surface 360 within the first area 362. The second area 364 includes a spool structure 376. Optical fiber slack can be looped around the outer perimeter of the second region 364 one or more times. In addition, the spool structure 376 defines channels 378 that allow the routing direction of the optical fiber to be switched (e.g., from clockwise to counterclockwise or vice versa) without bending the fiber beyond its minimum bend radius. Tabs 380 in both regions help to keep the optical fiber within the tray 350, i.e., between the tabs 380 and the major surface 360.

A portion of the feeder fiber F1 exits the protection tube PT1 and enters the second receiving section 162b of the same protection tube holder 120. Continuing axially (i.e., longitudinally) through the second receiving section 162b, the fiber F1 exits the protection tube holder 120 and within a short distance beyond the distal end of the protection tube PT1 enters one of the trays (in this case the bottom tray) 150 via an entryway 382 at the first end 352 of the lowermost tray 350 in the stack of staggered trays. The entryway 382 thus faces the distal end of the protection tube PT1.

In this example, the feeder fiber F1 is routed around the outer perimeter of the first area 362 and then back into the second area 364 where fiber slack of the feeder fiber F1 is looped one or more times around the spool structure 376 before the feeder fiber F1 re-enters the first are 362 where, in this example, it is spliced to another feeder fiber F5, the splice being held by the splice holder 370. The splice holder 370 is mounted to one of a plurality of splice mounting structures 319 defined on the major surface 360 in the first area 362. The feeder fiber F5 extends from the splice location into the second area 364 where, optionally, slack loops can be stored, and the feeder fiber F5 then exits the tray 350 via the entryway 384. Upon exiting the tray 350 via the entryway 384, the feeder fiber F5 enters another of the protection tube holders and another protection tube PT4 whose distal end faces the entryway 384 and whose distal end portion is held by the second tube holder.

The protection tube PT4 protects a length of the feeder fiber F5 that has been unsheathed from, and extends beyond, an end of the jacket of a jacketed feeder cable FC. The feeder cable FC can be one of a plurality of feeder cables FC entering the closure from a main feeder cable MFC. In some examples, one or more of the feeder cables FC are simply stored in the closure without their jackets being stripped and without their fibers being spliced or otherwise connected to drop cables. Protection tubes may not be needed for the fibers of such feeder cables, since the feeder cable jackets or other protective features provide sufficient protection. Slack of the feeder cables FC can be looped and stored between the uppermost of the trays 350 and the divider 304.

Figure 15:
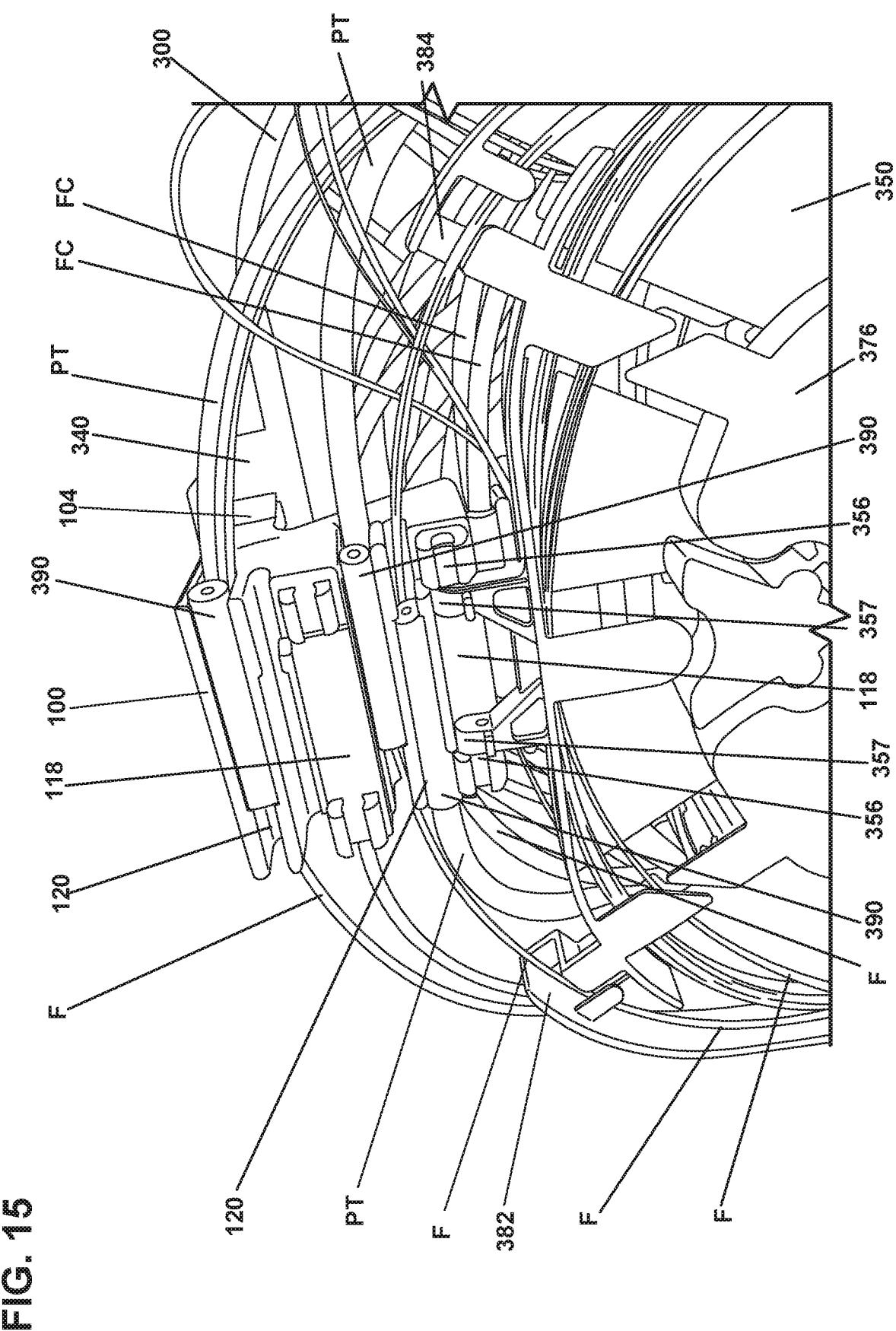
FIG. 15 illustrates an example of using the support structure of FIG. 4 for managing optical fibers.

In addition, as shown in FIG. 15, the jacketed feeder cables FC can also be held, like protection tubes, in protection tube holders of the support structure 100, whereby a stripped distal portion of the feeder cable FC distally extends beyond the protection tube holder that holds the jacketed feeder cable into a desired tray 350. Thus, the support structures of the present disclosure permit the option of installing and retaining in the protection tube holders one or both of: cables without protection tubes; and protection tubes protecting optical fibers.

The feeder cables FC ultimately extend into one of the main feeder cables MFC, which have axial end portions that are received in the closure 200 through one of the feeder cable ports.

In this example manner, optical signals propagating through the fiber F5 of the feeder cable FC from the main feeder cable MFC and into the closure 200 can be transmitted (via a splice) to the optical fiber F1 and thereby (via connectors) to the optical fiber F4 and the drop cable DC, and vice versa, while providing kink and/or pull protection at least to a portion of the optical fibers F5 and F1 through the use of the protection tubes PT4 and PT1, respectively, and the receiving of the protection tubes PT4 and PT1 in the support structure 100.

For illustration purposes only, incomplete portions of additional protection tubes PT2 and PT3, as well as portions of additional connectorized drop fibers F6, and feeder fibers F2 and F3, are also depicted in FIGS. 10, 11 and 13. It should be appreciated that, in a given set of operating conditions, the number of trays 350 and the number of protection tube holders 120 dictate how many tube-protected fibers can be routed between the lower region 310 and the upper region 308 and into a tray 350. It should also be appreciated that either tray entryway 382, 384 can function as a fiber entry into the tray 350 or fiber exit from the tray 350 depending on which side of the support structure 100 each protection tube is initially inserted.

Referring now to FIG. 15, another example of using the support structure 100 for managing optical fibers F is illustrated. As shown, portions of optical fibers F are held in protection tubes PT that enter the support structure 100 from both sides and are received in the appropriate receiving sections of protection tube holders 120 defined by the support structure 100. The fibers F extend beyond the distal ends of the protection tubes PT and into a selected one of the trays 350. The pins 356 of the tray couplers include round heads 357 that can rotate in their respective tray coupler retainers 118 to provide access to the trays above.

Optionally, a plug 390 can be removably inserted in any of the tube holders 120 receiving a protection tube PT below (or optionally, above) the respective protection tube PT. The plug 390 can be made of a flexibly resilient material, e.g., a foam or elastomeric material, that expands towards and grips the interior surface of the tube holder 120 and/or the exterior surface of the protection tube PT that is above it, to assist in holding the distal portion of the protection tube PT within the tube holder 120. In its relaxed state, the plug 390 can be at least substantially cylindrical with an outer diameter that is slightly larger than the interior width w1 (FIG. 6A) of a first receiving section 160a (FIG. 4) of a tube holder 120. Alternatively, a second protection tube can be received at the position of a plug 390 in one or more of the tube holders 120.

Figure 16:
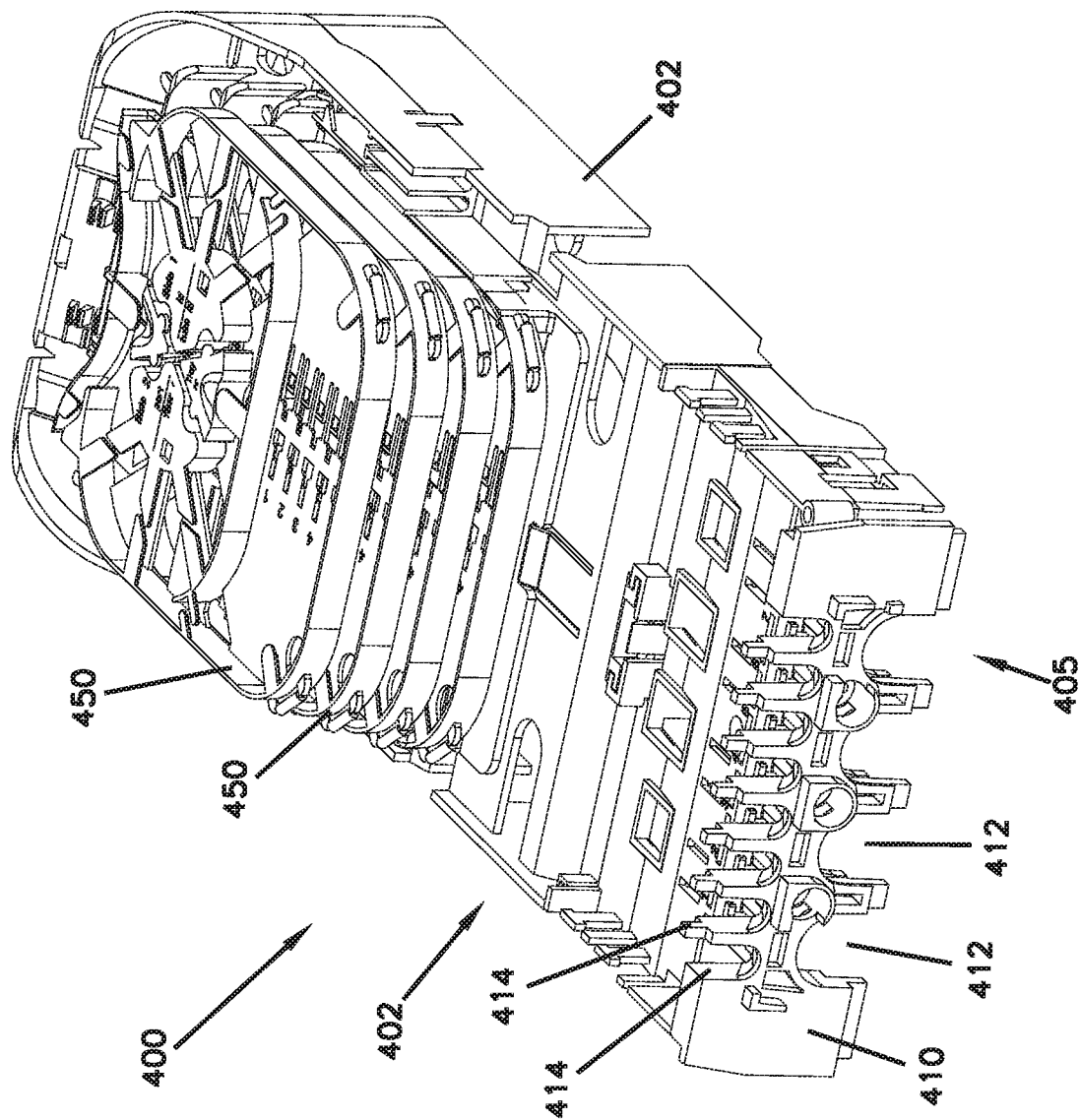
FIG. 16 is a perspective view of an alternative embodiment of a support structure arrangement that can be used with a support structure of the present disclosure.

FIG. 16 is a perspective view of an alternative embodiment of a support structure arrangement 400 and corresponding fiber management scheme that can be used with a support structure of the present disclosure, including a sealing block 410. The arrangement 400 and the sealing block 410 can be housed in a closure, such as the closure 200 described above. In the arrangement 400, fibers from drop cables enter the closure through drop cable ports 414 defined by the sealing block 410 on the same side of the arrangement as the trays 450. The fibers from the drop cables can be organized and managed (e.g., spliced) in the upper region 403 of the management device 402, including on the trays 450, the fibers being fed onto the trays 450 via the protection tube holders of the support structure (not shown) that supports the trays 450. Once exiting the trays 450, the fibers are routed to the lower region 405 defined by the management device 402, where they can be organized and routed back to a feeder cable terminated at a feeder cable port 412 defined by the sealing block 410.

Figure 17:
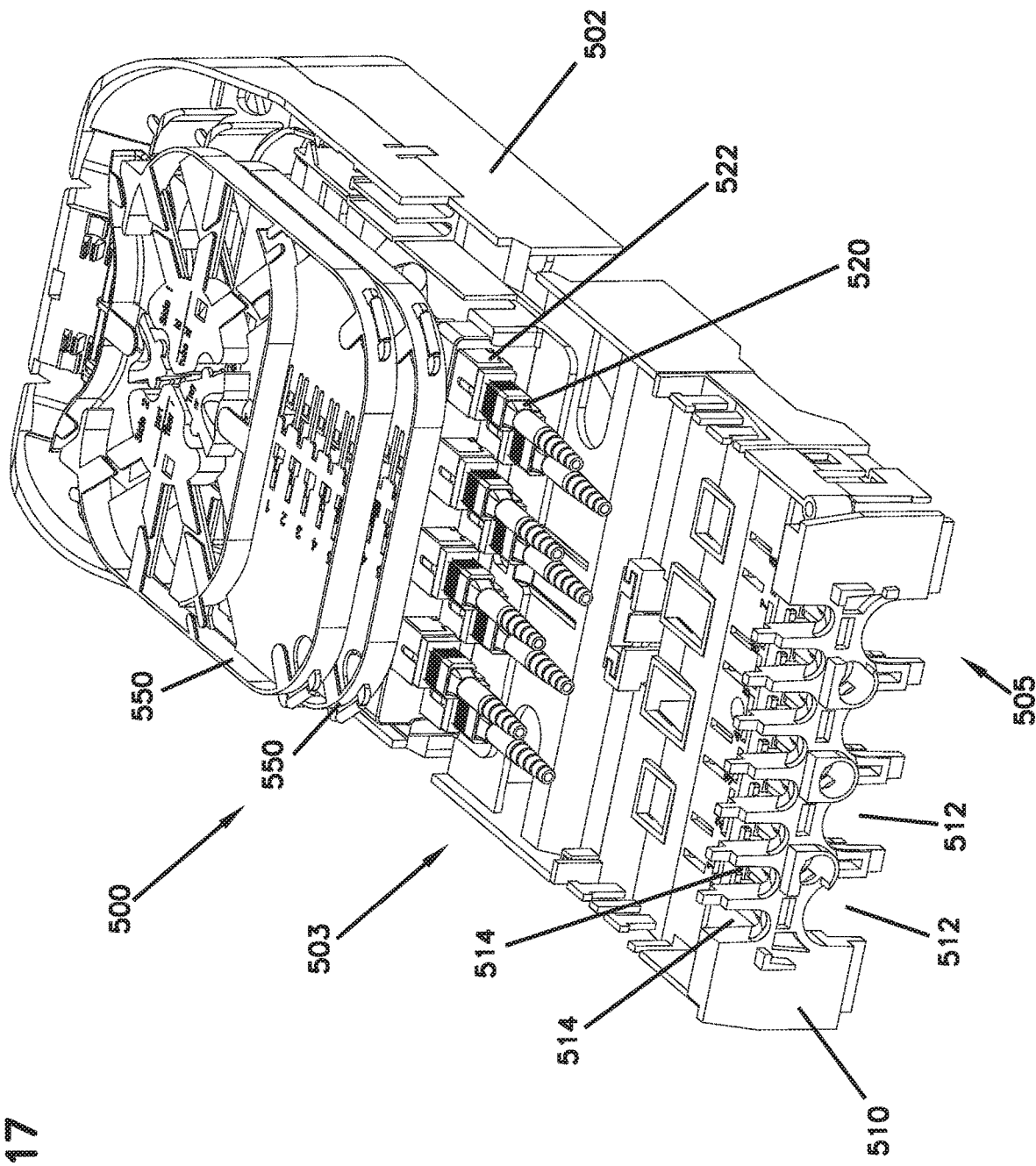
FIG. 17 is a perspective view of a further alternative embodiment of a support structure arrangement that can be used with a support structure of the present disclosure.

FIG. 17 is a perspective view of a further alternative embodiment of a support structure arrangement 500 that can be used with a support structure of the present disclosure, including a sealing block 510. The arrangement 500 and the sealing block 510 can be housed in a closure, such as the closure 200 described above. In the arrangement 500, fibers from drop cables enter the closure through drop cable ports 514 defined by the sealing block 510 on the same side of the arrangement as the trays 550. The fibers from the drop cables are terminated at connectors 520, which are arranged in two parallel rows. The connectors 520 are installed in adapters 522, providing optical connections to feeder fibers terminated at the opposing ends of the adapters 522. The feeder fibers are organized and managed in the upper region 503 of the management device 502, including on the trays 550, the fibers being fed onto the trays 550 via the protection tube holders of the support structure (not shown) that supports the trays 550. Once exiting the trays 550, the feeder fibers are routed to the lower region 405 defined by the management device 502, where they can be organized and routed back to a feeder cable terminated at a feeder cable port 512 defined by the sealing block 510.

Although in the foregoing description, terms such as "top" and "bottom," "upper" and "lower", "front" and "back," "side," and "distal" were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A telecommunications management tray support structure, comprising:
   a body, the body defining one or more tray coupler retainers adapted to receive and retain a fiber management tray coupler of a fiber management tray, the body further defining one or more protection tube holders adapted to hold a distal end portion of an optical fiber protection tube holding at least one optical fiber, each of the one or more protection tube holders including a shoulder adapted to act as a distal stop for a distal end of the protection tube.

2. The telecommunications management tray support structure of claim 1, wherein the body defines a plurality of the protection tube holders.

3. The telecommunications management tray support structure of claim 1, wherein the body defines a plurality of the protection tube holders and a plurality of the tray coupler retainers.

4. The telecommunications management tray support structure of claim 3, wherein a ratio of a number of the protection tube holders to a number of the tray coupler retainers is at least 2:1.

5. The telecommunications management tray support structure of claim 3, wherein a ratio of a number of the protection tube holders to a number of the tray coupler retainers is 4:1.

6. The telecommunications management tray support structure of claim 1, wherein the body extends from a first end to a second end, wherein the tray coupler retainers alternate with at least one of the protection tube holders from the first end to the second end.

7. The telecommunications management tray support structure of claim 1, wherein the body extends from a first end to a second end, wherein the tray coupler retainers alternate with pairs of the protection tube holders from the first end to the second end.

8. The telecommunications management tray support structure of claim 3, wherein each of the protection tube holders includes a first open longitudinal end defining a first opening and an opposing second longitudinal end defining a second opening, the first opening being wider than the second opening and being sized to receive a distal portion of a protection tube.

9. The telecommunications management tray support structure of claim 8, wherein each of the protection tube holders includes a first longitudinal portion extending longitudinally from the first opening and defining a first receiving section, and a second longitudinal portion extending longitudinally from the second opening and defining a second receiving section, the second receiving section defining a lateral inner diameter that is smaller than a corresponding lateral inner diameter defined by the first receiving section such that the first receiving section is sized to receive a distal portion of a protection tube, such that the second receiving section is sized to be too small to receive the distal portion of the protection tube, and such that a transition between the first receiving section and the second receiving section defines the shoulder, the shoulder projecting radially towards a longitudinal axis of the protection tube holder.

10. The telecommunications management tray support structure of claim 8, wherein the plurality of protection tube holders are arranged in pairs, and wherein the first openings of each of the pairs are positioned at opposite ends of the respective protection tube holders.

11. The telecommunications management tray support structure of claim 2, wherein each of the protection tube holders is adapted to receive one, two, or more protection tubes.

12. The telecommunications management tray support structure of claim 2, wherein each of the protection tube holders defines a slot through which one or more protection tubes can be inserted to be received by the protection tube holder.

13. A telecommunications closure system, comprising:
a telecommunications management tray support structure including a body, the body defining tray coupler retainers each adapted to receive and retain a fiber management tray coupler, the body further defining one or more protection tube holders adapted to hold a distal end portion of an optical fiber protection tube;
at least one optical fiber management tray coupled to the tray support; and
a protection tube having a distal end portion and a distal end positioned in one of the one or more protection tube holders, the protection tube holding a plurality of optical fibers,
wherein the telecommunications management support structure and the at least one optical fiber management tray are arranged such that one of the optical fibers extending from the distal end of the protection tube can be routed onto the fiber management tray via the one of the one or more protection tube holders.

14. A method of routing an optical fiber onto an optical fiber management tray, comprising:
providing a telecommunications management tray support structure including a body, the body defining one or more tray coupler retainers adapted to receive and retain a fiber management tray coupler, the body further defining one or more protection tube holders;
coupling an optical fiber management tray to one of the tray coupler retainers;
inserting a distal end portion and a distal end of a protection tube into one of the protection tube holders; and
feeding a portion of an optical fiber extending distally beyond the distal end of the protection tube into the optical fiber management tray.

15. The method of claim 14, wherein the optical fiber management tray includes a first end and an opposite second end, the first end including a coupler for coupling the tray to one of the tray coupler retainers, and wherein the feeding includes feeding the portion of the optical fiber extending distally beyond the distal end of the protection tube through a fiber entryway defined by the tray and positioned at the first end of the tray.

16. The method of claim 14, wherein the inserting includes inserting distal end portions of first and second protection tubes into one of the protection tube holders.

17. The method of claim 14, wherein the inserting includes inserting distal end portions of first and second protection tubes into first and second of the protection tube holders, wherein one of the tray coupler retainers is positioned between the first and second protection tube holders.

18. The method of claim 17, wherein the feeding includes feeding a portion of a first optical fiber extending distally beyond a distal end of the first protection tube through a first fiber entryway defined by a first or a second optical fiber management tray and positioned at the first end of the first or the second optical fiber management tray and on a first side of the tray support structure, and feeding a portion of a second optical fiber extending distally beyond a distal end of the second protection tube through a second fiber entryway defined by the first or the second optical fiber management tray and positioned at the first end of the first or the second optical fiber management tray and on a second side of the tray support structure.

19. The method of claim 18, wherein the feeding of the portion of the first optical fiber is onto the same optical fiber management tray as the feeding of the portion of the second optical fiber.

20. The method of claim 18, wherein the feeding of the portion of the first optical fiber is onto a different one of the first and second optical fiber management trays than the feeding of the portion of the second optical fiber.

21. The method of claim 14, wherein each of the protection tube holders defines a slot through which one or more protection tubes can be inserted to be received by the protection tube holder, and wherein the method further comprises, after the inserting, inserting a plug at least partially through the slot, the plug being adapted to retain the protection tube within the protection tube holder.

22. The method of claim 14, further comprising, prior to the feeding, inserting the optical fiber through the protection tube.

23. A telecommunications management tray support structure, comprising:

a body, the body defining one or more tray coupler retainers adapted to receive and retain a fiber management tray coupler of a fiber management tray, the body further defining a plurality of protection tube holders each adapted to hold a distal end portion and a distal end of an optical fiber protection tube, wherein each of the protection tube holders includes a first open longitudinal end defining a first opening and an opposing second longitudinal end defining a second opening, the first opening being wider than the second opening and being sized to receive a distal portion of a protection tube;

wherein the plurality of protection tube holders are arranged in pairs; and wherein the first openings of each of the pairs are positioned at opposite ends of the respective protection tube holders.

* * * * *